UNITED STATES PATENT OFFICE.

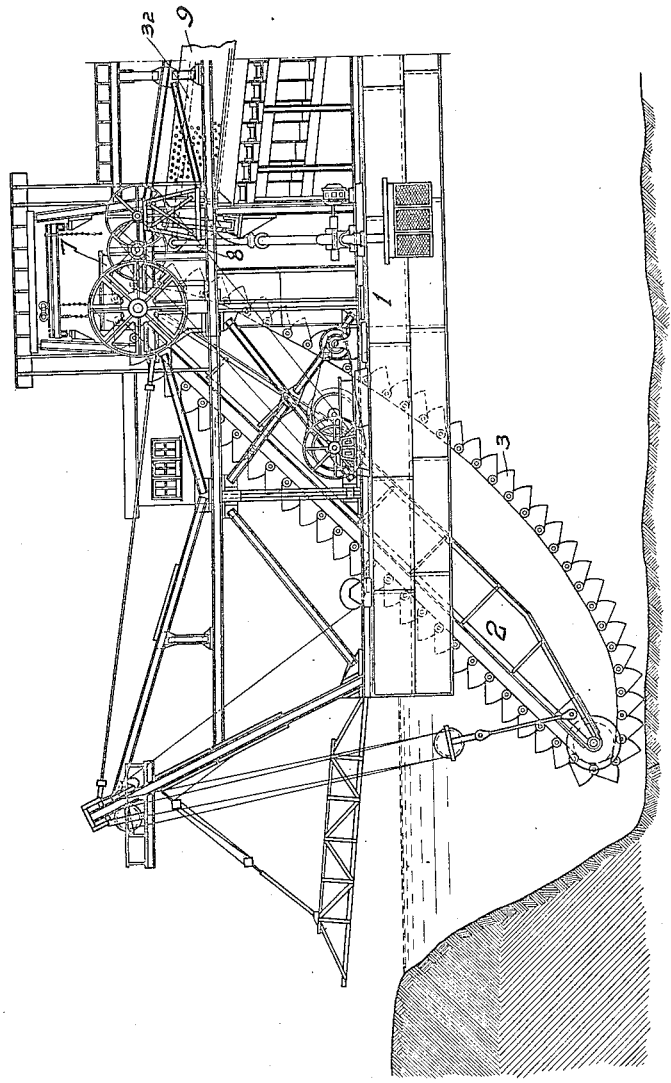

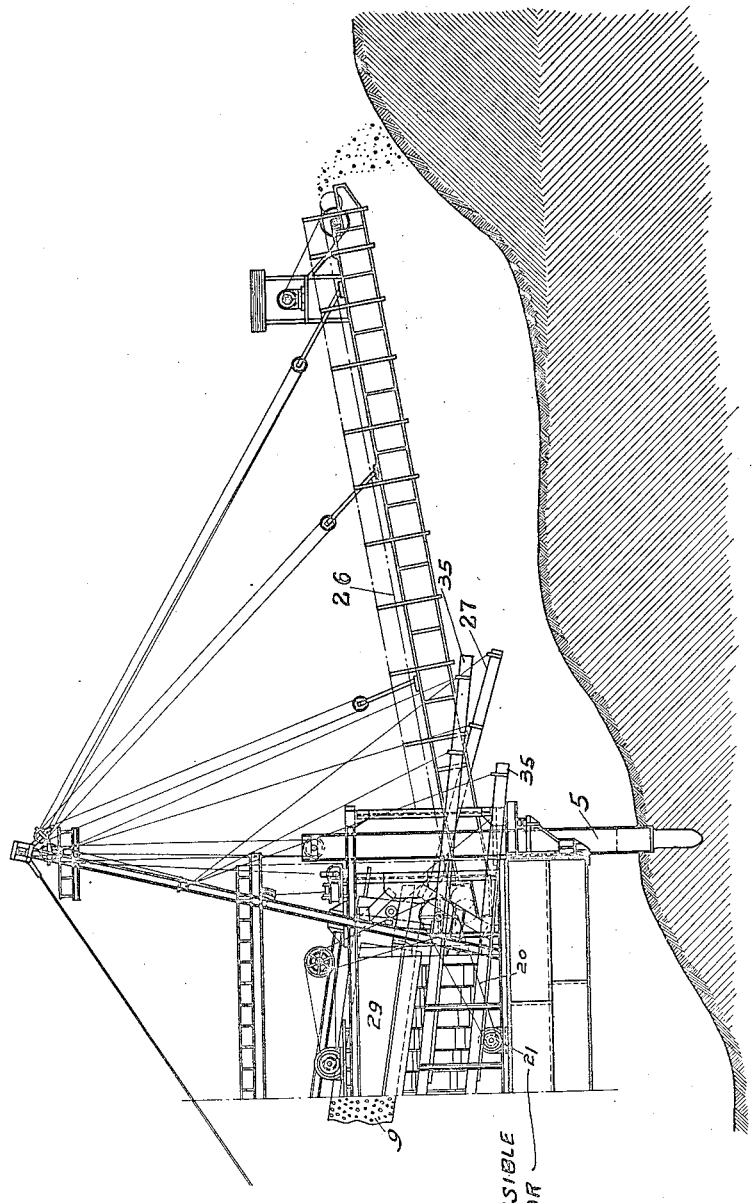

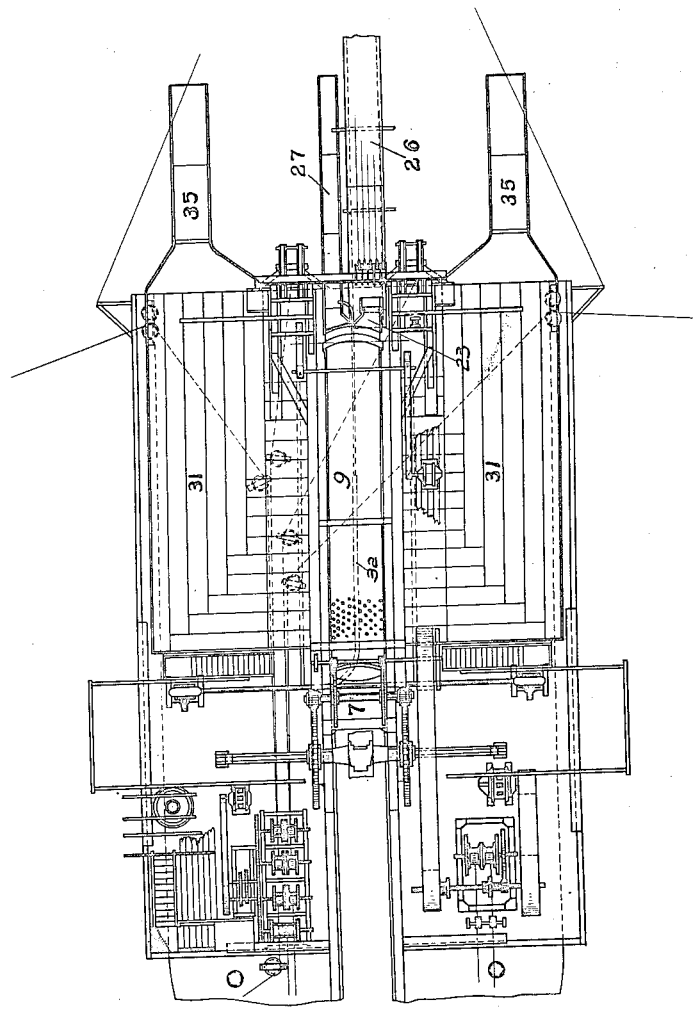

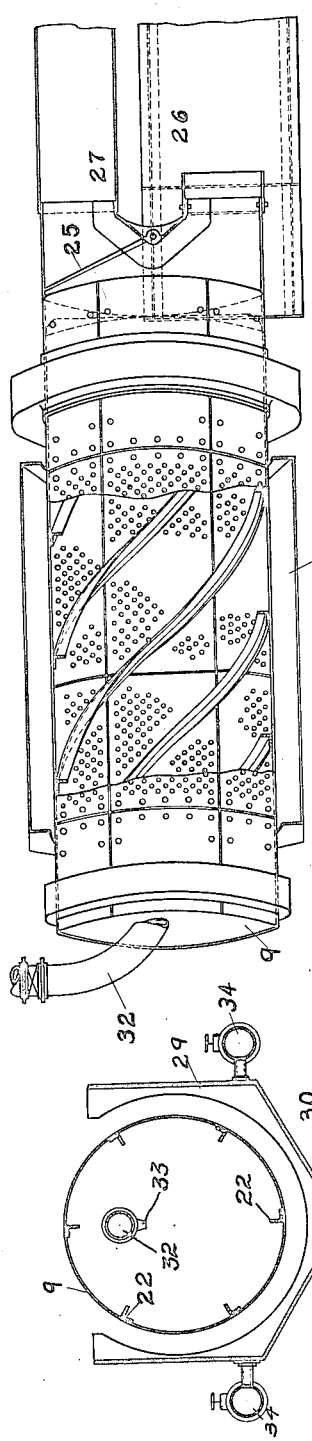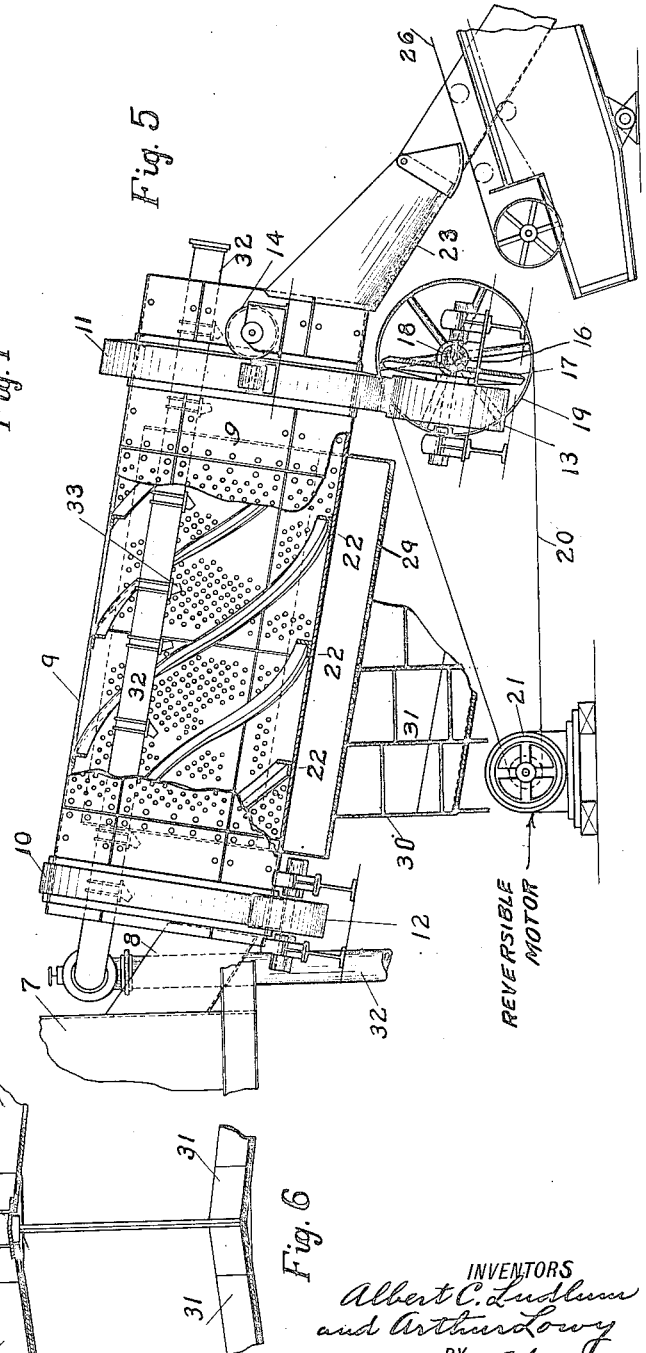

ALBERT C. LUDLUM, OF NEW YORK, N. Y., AND ARTHUR LOWY, OF NEWARK, NEW JERSEY, ASSIGNORS TO NEW YORK ENGINEERING COMPANY, A CORPORATION OF NEW YORK.

DREDGE.

1,403,260. Specification of Letters Patent. Patented Jan. 10, 1922.

Application filed February 2, 1918. Serial No. 215,185.

*To all whom it may concern:*

Be it known that we, ALBERT C. LUDLUM and ARTHUR LOWY, citizens of the United States, and residents of New York, in the county of New York and State of New York, and Newark, in the county of Essex and State of New Jersey, respectively, have invented certain new and useful Improvements in Dredges, of which the following is a specification.

This invention relates to gold dredges, and has for its object, to enable the various kinds of materials to be handled in a simpler and cheaper manner than with previous practice.

In gold dredging, for example, the machine must at various times handle top soil, clay, overburden and pay dirt, and more or less water. The volume of top soil and overburden to be handled is at times very large, and it is desirable to handle this in the quickest manner. In some localities, it is required that the worked over ground be resoiled. These various operations on other than pay dirt must be carried on with as little apparatus as possible and in such manner as not to clog either the screen or the saving tables, in order to avoid shut downs for repairs, or cleaning. If all the excavated material is passed through the ordinary shaking screen, it quickly becomes clogged with clay or the like. It is also very objectionable to pass clay or soil over the saving tables, because they quickly become gummed up or clogged, and have to be cleaned out before the values in the pay dirt can be fully obtained.

By this invention, means is provided for handling relatively dry clay, soil and overburden over a shaking screen at a rapid rate without clogging either the screen or the tables by combining the screen with a conveyer, and pay dirt is agitated and washed through the screen onto the tables at such slower rate as to obtain practically all the values when the conveyer is inoperative. The tailings are all discharged from the screen into a conveyer, which can be set either to deliver the overburden into an overboard conveyer, or to deliver the top soil to a stacker, as may be desired. The screen is preferably of the perforated revolving type and reversibly driven, and the rapid conveyer consists of interior spiral ribs carried by the screen, so that when the screen is driven in a certain direction, as for dry clay, overburden, etc., the spiral ribs accelerate the feed towards the discharge end, and none of this worthless material passes through the screen meshes onto the saving tables. When the screen is driven in the other direction in handling pay dirt, the rapid conveyer is inoperative and the ribs retard and break up the material, which is thereupon washed through the screen meshes by water jets combined with the screen, and then carried over the tables.

The accompanying drawings show a dredge embodying a preferred form of the invention, in which—

Fig. 1 is an elevation of the front end of a dredge,

Fig. 2 is a similar elevation of the rear end,

Fig. 3 is a plan view of the rear end,

Fig. 4 is a plan view, on an enlarged scale, of the screen and the discharge conveyers.

Fig. 5 is a side elevation of Fig. 4, and

Fig. 6 is a cross section of the screen, looking towards the front.

1 is a float carrying a ladder 2 on which is an endless chain of buckets 3 running over wheels at the top and bottom, the former being driven in the usual manner. The float is held stationary by spuds 5, and the ladder is raised and lowered in the usual manner. The chain buckets 3 discharge at the top into a hopper 7 having a chute 8 discharging into the rotary screen 9. The screen consists of a cylinder having bearing rings 10, 11 running on rollers 12, 13 and set at an incline to gradually feed the material. 14 is a thrust roller bearing on the side of ring 11. The screen is driven by roller 13 through shaft 16, bevel gears 17, 18, pulley 19, belt 20 from the reversible variable speed motor 21. The interior of the screen is preferably provided with spiral ribs 22 which constitute a conveyer and accelerate the feed of the material when the screen is rotated counterclockwise as viewed from the rear or lower end. When the screen is rotated clockwise, these ribs are merely agitators which assist the shaking of the material caused by movement of the screen. The material which passes over the screen is discharged into a tail chute 23, which is provided with two discharges controlled by a swinging gate 25. The gate 25 controls the discharge of material either to a belt stacker 26, for depositing the material at a distance from the float, or to an overboard chute 27 which discharges directly overboard.

Below and partially enclosing the screen is a box 29 having a perforated bottom 30 opening above the tables 31. The screen also contains a water supply pipe 32 having nozzles 33 discharging downwardly into the lower side of the screen, and the box 29 is supplied with pressure water on each side by pipes 34. The material is discharged overboard after flowing over the tables by tailings chutes 35.

When the machine is stripping the top soil and overburden down to the pay dirt, where a large volume of material must be handled as quickly as possible, the screen is rotated in such direction as to discharge the dry material rapidly. The water in pipes 32 and 34 is shut off at this time and the material runs through practically dry, being supported by the screen and fed by its inclination in conjunction with the ribs 22. Clay, top soil, coarse gravel, boulders, etc., are all handled dry with equal facility by the chain bucket digger and the combined screen and conveyer. Clay or other objectionable materials do not get to the tables, owing to the rapid feed, and either the meshes filling up, or accumulation in the box 29. If resoiling is to be done, the stacker 26 can be used, by leaving gate 25 in the position shown, or the stacker can be used either for the overburden which passes over the screen, whether in preparatory work, or in working on pay dirt. If the gate is shifted, so as to render chute 27 effective, the material is directly discharged overboard without additional lifting. When the pay dirt is reached, the function of the screen as a rapid conveyer for discharging the material independently of the tables, is changed by reversing its direction of rotation and supplying water under pressure to the nozzles 33 inside the screen, and to the box 29. The first rush of water will now wash out the meshes of the screen, and the box, and the ribs 22 now act as baffles to stir up the material in progress so as to permit all of the values to be washed through onto the tables. The coarse material which passes out of the end of the screen can be disposed of in the manner previously described, according to the position of gate 25. It will be understood that the inclination of the screen, and the pitch of the ribs 22, will be so proportioned as to give the desired rates of feed according to the direction and speed of rotation.

It will be seen that in principle, the inclined screen constitutes a slow conveyer which feeds by its movement and inclination, while the spiral ribs constitute a second conveyer when moved in one direction, and mere stirrers or agitators when moved in the other direction, so that the principle of the invention could be carried out by other forms of shaking screens combined with a separately mounted and controllable conveyer for moving material rapidly over the screen when the water is shut off. It is more simple and satisfactory in practice to combine these two conveyers into one structure and to reverse the entire movement, as herein specifically shown, rather than to reverse or merely stop the rapid conveyer when pay dirt is being shaken and washed by the screen.

So far as we are aware, the combination of a separating screen with a water supply and a reversible conveyer, controlled in such manner that worthless material is fed through rapidly without passing to the tables, and values thoroughly washed and fed through slowly, is new. By this combination a large economy in cost of apparatus is obtained, the machine is simplified, and the cost of handling material very much reduced.

What is claimed is:

1. The combination in a gold dredge with a digger and conveyer of a rotatable screen having spiral internal ribs receiving all of the material dug and driven in such direction relatively to the pitch of said ribs as to transfer the material as supplied by the digger, a tail conveyer receiving the material from the screen and discharging it at a distance, a box enclosing the lower portion of the screen having a restricted bottom aperture preventing free discharge of dry fine material passing through the screen, saving tables below the box aperture, means for supplying water to the box when fine material is to be passed to and over the tables, and means for discharging material from the tables.

2. The combination in a gold dredge with a digger and conveyer of a rotatable screen having spiral internal ribs receiving all of the material dug and driven in such direction relatively to the pitch of said ribs as to transfer the material as supplied by the digger, a tail conveyer receiving the material from the screen and discharging it at a distance, a box enclosing the lower portion of the screen having a restricted bottom aperture preventing free discharge of dry fine material passing through the screen, saving tables below the box aperture, means for supplying water to the box and for reducing the speed of travel of material through the screen when fine material is to be passed to and over the tables, and means for discharging material from the tables.

3. The combination in a gold dredge of a digger and conveyer, a rotatable inclined screen having internal spiral ribs disposed to receive all of the material dug and conveyed, reversible driving means for the screen, a box below and adjacent to the screen having a restricted bottom opening, means for supplying water to flow into the box, saving tables below the box outlet, a tail conveyer, and means for discharging material from the end of the screen to the tail conveyer.

Signed at New York, in the county of New York and State of New York, this 23rd day of January, A. D. 1918.

ALBERT C. LUDLUM.
ARTHUR LOWY.

Witness:
JOSEPH TRAMUTOLO.